United States Patent [19]

Shirai

[11] 4,333,550
[45] Jun. 8, 1982

[54] BRAKE SHOE AND SUPPORT STRUCTURE FOR A DISC BRAKE

[75] Inventor: Kenji Shirai, Susono, Japan

[73] Assignee: Toyota Jidosha Kogyo Kabushiki Kaisha, Aichi, Japan

[21] Appl. No.: 151,640

[22] Filed: May 20, 1980

[30] Foreign Application Priority Data

Feb. 4, 1980 [JP] Japan .................................. 55-12234

[51] Int. Cl.³ .............................................. F16D 55/15
[52] U.S. Cl. ................................ 188/72.2; 188/72.3; 188/73.2; 192/70.23
[58] Field of Search ................... 188/72.2, 73.2, 73.1, 188/234, 723, 250 B; 192/70.23

[56] References Cited

U.S. PATENT DOCUMENTS

| | | | |
|---|---|---|---|
| 1,892,816 | 1/1933 | Thornburgh | 188/234 X |
| 2,526,143 | 10/1950 | Lambert | 188/72.2 |
| 3,162,271 | 12/1964 | Hanson | 188/73.1 |
| 3,315,769 | 4/1967 | Francois | 188/72.2 |
| 3,421,604 | 1/1969 | Hebbs | 188/73.1 X |
| 3,860,094 | 1/1975 | Breton | 185/72.2 X |
| 3,869,024 | 3/1975 | Hauth et al. | 188/72.2 X |
| 4,090,591 | 5/1978 | Pollinger et al. | 188/73.1 |

FOREIGN PATENT DOCUMENTS 483579 2/1970 Switzerland ....................... 188/73.1

*Primary Examiner*—George E. A. Halvosa
*Attorney, Agent, or Firm*—Browdy and Neimark

[57] ABSTRACT

A disc brake comprises a disc rotor, a pair of braking pad assemblies consisting of a friction pad and a backing plate, a transmitting member for transmitting urging force from an actuator to the braking pad assembly, a stopper for limiting the movement amount of the braking pad assembly in the rotational direction of the disc rotor, and a pad return spring. The total thickness of the backing plate plus the transmitting member is made variable through a slant surface made on both members respectively in a complementary contacting state. When the brake is applied the backing plate is slidably moved the rotational direction of the disc rotor along the slant surface of the transmitting member to increase the total thickness before it abuts a stopper member, and when the brake is released the total thickness is decreased to the original value by the movement of the backing plate in the reverse direction by the pad return spring along the slant surface to ensure the brake clearance between the braking pad assembly and the disc rotor.

6 Claims, 10 Drawing Figures

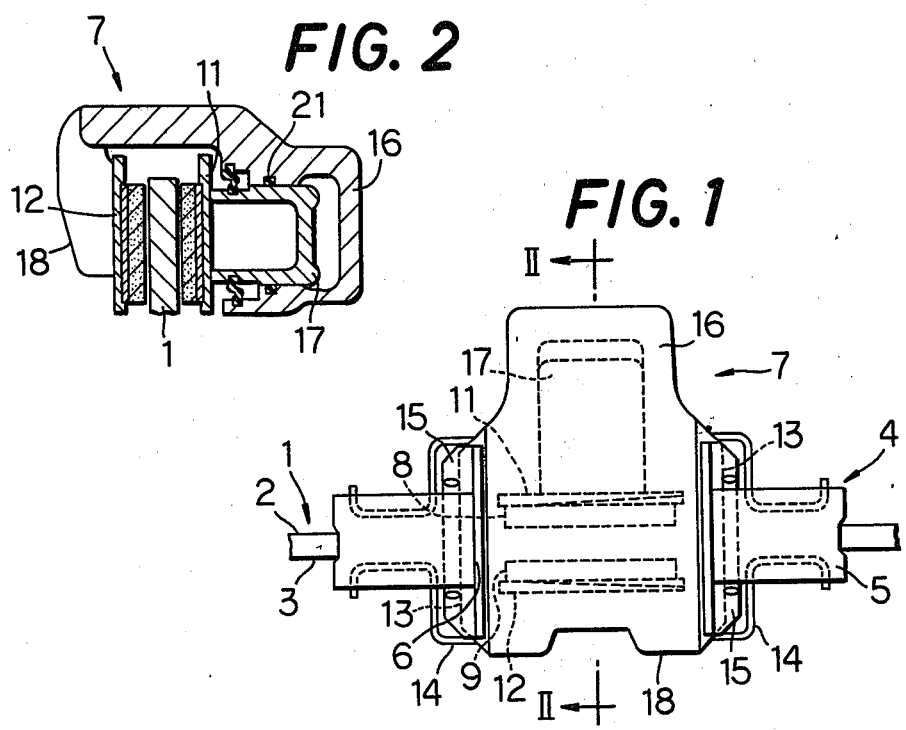
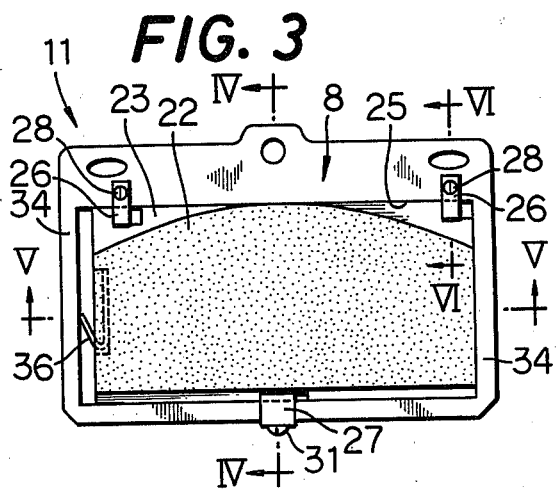
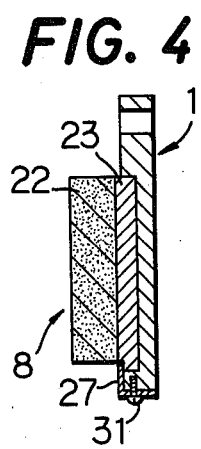
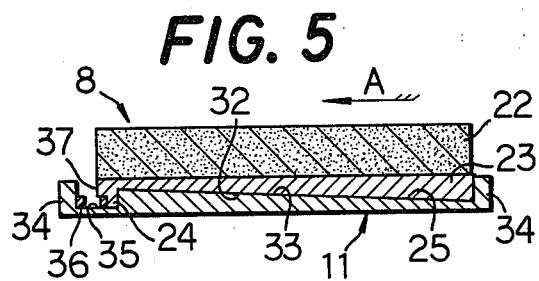
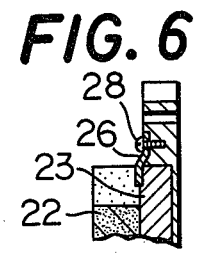

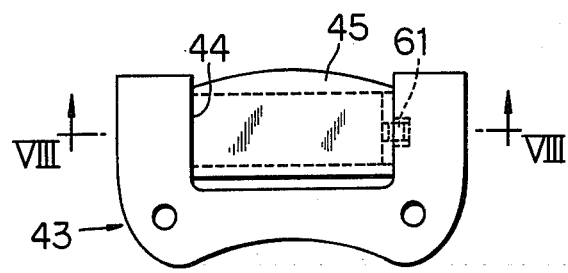
FIG. 7
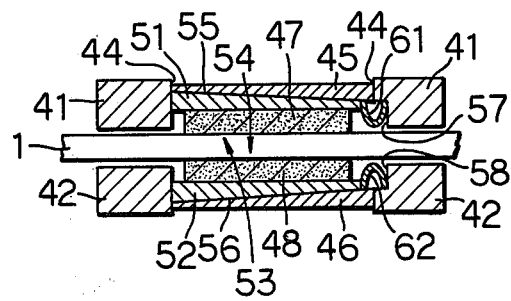
FIG. 8
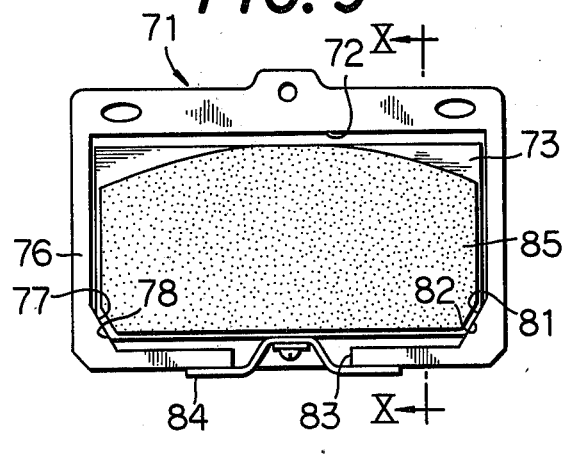 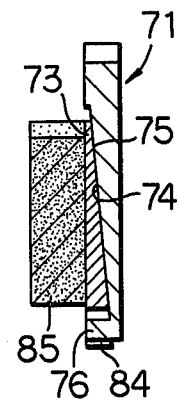
FIG. 9  FIG. 10

4,333,550

BRAKE SHOE AND SUPPORT STRUCTURE FOR A DISC BRAKE

FIELD OF THE INVENTION

This invention relates to a disc brake, and more particularly to the reduction of the dragging torque of a disc brake while being in non-braking state.

BACKGROUND OF THE INVENTION

A disc brake is a type of brake wherein a pair of braking pad assemblies are urged on both friction surfaces formed on a rotary disc to restrain the rotation of the disc, and it is widely used for cars and the like.

The disc brake is at present not free from a serious problem which is concerned with a great likelihood of giving rise to a so-called dragging phenomenon. That is, the braking pad assemblies which are urged onto the disc surfaces are liable to further remain thereon in the urged state at a certain amount of force, even after the brake has been released of its operation. When this dragging happens to force the disc to be rotated under the continuous dragging torque, the resultant energy loss will amount to more than a negligible value. It is frequently said that the reduction of the dragging torque of this kind during the non-braking operation period is a key to the attainment of the fuel consumption economy desired in cars at the present stage.

The dragging phenomenon often shortens life of the braking pad assemblies through increase of wearing, and further causes overheating of the brake system. The overheating decreases in turn the coefficient of friction of the braking pad assemblies, consequently deteriorates the braking effect, and it sometimes leads to the vapor-lock, when the braking fluid may be boiled by chance with a result of rendering the brake system incapable or inefficient in performing its function.

SUMMARY OF THE INVENTION

This invention was made to overcome the disadvantages mentioned above. A principal object of this invention is therefore to provide a disc brake capable of reducing the dragging torque during the non-braking operation period by means of separating the braking pad assemblies from the surface of the disc or disc rotor.

Another object of this invention is to provide a disc brake of a type wherein a specific device is installed, between the braking pad assemblies and an actuator for urging them onto the disc rotor, which device functions on one hand to impart to a braking pad assembly a larger amount of urging movment toward the disc rotor than the movement amount given by the actuator, due to a so-called accompanying rotational torque, a tendency of the disc rotor to bring the braking pad assembly in rotation together with itself owing to the friction therebetween, acting on the braking pad assembly, when the brake is applied, and on the other hand, when the brake is released of its operation, to positively act in separating the braking pad assembly from the disc rotor.

Still another object of this invention is to provide a disc brake having such a structure that a backing plate of the braking pad assembly shows an effect substantially equal to be able to inflate or increase its thickness, when the brake is applied, and to shrink or decrease the thickness, when the brake is released, and thereby a clearance substantially corresponding to the variation amount of the thickness of the backing plate can be ensured.

Further object of this invention is to provide a disc brake attainable of the above-mentioned objects with a structure as simple as possible and at a cost as low as possible.

A disc brake in accordance with this invention includes (a) a disc rotor having on either side thereof a friction surface, (b) a pair of braking pad assemblies respectively consisting of a friction pad disposed face to face with said friction surface and a backing plate stuck to the rear side of said friction pad, (c) an actuator disposed face to face with said backing plate for urging said braking pad assemblies onto said friction surfaces of said disc rotor, (d) a transmitting member disposed at least between one of said braking pad assemblies and said actuator for transmitting the urging force of said actuator to said one of the braking pad assemblies, (e) slant surface means formed on said transmitting member to push outwards said one of the braking pad assemblies, when the brake is applied and said one of the braking pad assemblies is rotated, frictionally driven by said disc rotor, (f) stopper means for limiting the movement amount of said one of the braking pad assemblies in the rotational direction of said disc rotor, and (g) a return spring for restoring said one of the braking pad assemblies to the original position, when the brake is released of its operation.

The above-mentioned slant surface means is not limited to one slant surface, but a set of slopes or slant surfaces, more than one of which functions to push the braking pad assembly toward the disc rotor in a close cooperation, is also included in this invention.

BRIEF DESCRIPTION OF THE DRAWINGS

FIG. 1 is a plan view of an embodiment of a disc brake in accordance with this invention;

FIG. 2 is a cross sectional view taken along the section line II—II in FIG. 1;

FIG. 3 is an elevational view of a braking pad assembly and a transmitting member shown in FIGS. 1 and 2;

FIG. 4 is a vertical sectional view of FIG. 3 taken along the section line IV—IV;

FIG. 5 is a transverse sectional view taken along the section line V—V in FIG. 3;

FIG. 6 is a partial vertical sectional view taken along the section line VI—VI in FIG. 3;

FIG. 7 is an elevational view of another embodiment of a disc brake in accordance with this invention;

FIG. 8 is a transverse sectional view taken along the section line VIII—VIII in FIG. 7;

FIG. 9 is an elevational view of another embodiment of the braking pad assembly and the transmitting member shown in FIG. 1; and FIG. 10 is a vertical sectional view taken along the section line X—X in FIG. 9.

DETAILED DESCRIPTION OF THE PREFERRED EMBODIMENTS

With reference to the appended drawings detailed description of the preferred embodiments will be made hereunder. A disc rotor 1, in FIGS. 1 and 2, is provided with, on either side at a portion near the periphery thereof, a friction surface 2 and 3 and rotated with a wheel of a vehicle (not shown) about the axis. In the neighborhood of the disc rotor 1 a torque member or a torque receiving member 4 is disposed, which member is composed of a pair of flat plate portions (not shown), parallelly disposed to the friction surfaces 2, 3 of the disc rotor 1 on either side thereof, and a connecting portion 5 which connects the flat plate portions crossing over the periphery of the disc rotor 1, and is secured to a non-rotating portion of the car such as a knuckle or an axle housing. In the central part of the torque member 4 an opening 6 is formed, wherein a caliper 7, an inner pad 8, an outer pad 9, and a pair of transmitting members 11 and 12 are disposed.

The caliper 7 is movably carried on either side thereof at a ridge 13, 13 by the torque member 4 via a spring 14 and a guide member 15 in a parallel direction to the axis of the disc rotor 1. The spring 14 is at either end portion thereof engaged with the torque member 4 and at an acting portion in the middle thereof abutted to the lower surface of the ridge 13; the guide member 15 is interposed between the torque member 4 and the ridge 13. The caliper 7 is provided with a piston 17 slidably fitted into a cylinder 16 and a reactionary portion 18 which is faced to the outer pad 9. When brake fluid is supplied into the cylinder 16 the piston 17 will urge the inner pad 8 onto the friction surface 2 of the disc rotor 1 and at the same time the reactionary portion 18 urges the outer pad 9 onto the friction surface 3 by a reactionary force generated by the above-mentioned action so as to restrain the rotation of the disc rotor 1 by the friction imparted on either side thereof. A piston seal 21 keeps the oil-tightness between the piston 17 and the cylinder 16 and helps the piston 17 to be restored to the original neutral position when the fluid pressure is removed, by means of being elastically deformed while the piston 17 is pushed outwards.

The inner pad 8 is, as shown in FIG. 3 through FIG. 6, composed of a friction pad 22 and a backing plate 23 stuck thereto. The rear side surface of the backing plate 23, the lower side in FIG. 5, is made into a gentle slant surface or a slope, such that the distance thereto from the friction surface of the disc rotor 1 is progressively decreased in the rotational direction of the disc rotor, the leftward direction in FIG. 5, when the car is advancing forwardly. On the rear side of the backing plate 23 a protrusion projecting rearwardly, as shown in FIG. 5, is formed near the left side end thereof.

Between the backing plate 23 and the piston 17 a transmitting member 11 is disposed for transmitting the urging force of the piston 17 to the backing plate 23. On one side of the transmitting member 11 faced to the backing plate 23 a first recess portion 25 and a second recess portion 35 are formed. The former, which is slightly wider than the width of the backing plate 23 in the lateral direction, accommodates therein the backing plate 23 snugly in a corner formed by a flange portion 34 on the right hand end thereof and holds the same unremovably at the either end on the upper portion with a pair of leaf springs 26, 26 and a pair of screws 28, 28, and at the central portion at the lower side with a leaf spring 27 and a screw 31 respectively. The bottom surface of the first recess portion 25 is also made into a slant surface 33 or a slope, inclined at the same angle with that of the backing plate 23, just to be complementary with each other. The second recess portion 35 formed on the left hand end portion of the transmitting member 11 (see FIG. 5) as a continuation of the first recess portion 25 receives thr protrusion 24 of the backing plate 23 in it for constantly urging it rightwardly with a leaf spring 36 as a return spring.

Between the reactionary portion of the caliper 7 and the disc rotor 1 the outer pad 9 and the transmitting member 12 are disposed, just in a symmetrical manner to the combination of the inner pad 8 and the transmitting member 11, in an entirely identical structure, requiring no further explanation.

Operation of the disc rotor having the above-mentioned structure will be explained hereunder.

When fluid pressure is applied into the cylinder 16, it is transmitted to the piston 17 to be, in turn, transmitted to the inner pad 8 via the transmitting member 11. The inner pad 8 is pushed ahead toward the disc rotor 1 until the friction pad 22 abuts the disc rotor 1. The moment when the friction pad 22 contacts the disc rotor 1 an accompanying rotational force or a drawing force of the disc rotor 1 begins to act on the friction pad 22 owing to the friction therebetween in the direction of arrow A, which consequently causes the inner pad 8 consisting of the friction pad 22 and the backing plate 23 to be moved, against the resilient force of the leaf spring 36, along the slant surface 33 of the transmitting member 11. Such a movement of the inner pad 8 gives itself a force of pushing the same ahead toward the disc rotor 1 resisting the elasticity of the leaf springs 26, 26, and 27, because of the increase of the total thickness of the backing plate 23, plus the transmitting member 11, to facially contact the disc rotor 1. The combination of the transmitting member 11 and the backing plate 23 can be regarded, in a sense, as a member corresponding to the conventional backing plate in the disc brake. Theoretically speaking, it can be considered as if the backing plate were inflated as the brake is applied, to increase the thickness thereof when viewed from the standpoint of the effect. The inner pad 8 is moved leftwards until it is blocked in its advance by the abutment to the inner side of the flange 34 of the transmitting member 11 at a left hand end 37 of the backing plate 23.

The abutment of the inner pad 8 to the disc rotor 1 instantly incurs an action of the reactionary force of the reactionary portion 18 of the caliper 7. This reactionary force is delivered to the outer pad 9 via the transmitting member 12, pushing ahead in turn the outer pad 9 toward the disc rotor 1 for abutting on the friction surface 3. With the identical action in the inner pad 8, the outer pad 9 contacts the disc rotor 1 to restrain the rotation thereof.

When the braking fluid is removed by releasing the brake, the piston 17 is restored by the action of the piston seal 21 to the original neutral position, and the inner pad 8 is released not only from the fluid pressure but also from the accompanying rotational force of the disc rotor 1, which consequently moves the backing plate 23, with the aid of the spring force of the left spring 36 and the leaf springs 26, 26, 27, rightwardly (see FIG. 5) along the slant surface 33. It naturally creates a clearance between the friction surface 2 of the disc rotor 1 and the friction pad 22. If the combination of the transmitting member 11 and the backing plate 23 may be regarded as a backing plate in the conventional way of thinking, the thickness of the backing plate can be considered to be decreased, when the brake is released, viewed from a sense of effect.

As described above in greater detail the disc brake of this type is very effective in eliminating the dragging phenomenon of the brake in the non-braking operational time, and consequently contributes a great deal to the fuel economy and life elongation of the braking pad assemblies through assuring a predetermined amount of clearance between the disc rotor and the inner-and outer pads in the brake releasing time.

In this sort of structure the inner-and outer pads 8, 9, when being abutted on the friction surfaces 2, 3, are automatically pushed ahead toward the disc rotor 1 to enhance the braking effect. It advantageously contributes to improve the braking effect in addition to the primary effect of eliminating the dragging phenomenon.

Further advantage is that conventionally used disc brake systems can be utilized as they are, because the combination of the invented inner-and outer pads 8, 9 and the transmitting members 11, 12 can be easily replaced for the conventionally used braking pads.

In the above described embodiment the piston seal 21 is employed for the restoration or the retraction of the piston 17 to the original neutral position. This sort of seal may be deteriorated in use over a long time, and degradation of the piston retracting function must be taken into account. Even in such a case the clearance between the disc rotor 1 and the inner-and outer pads 8, 9 is assured from the above-mentioned structural features. So the piston seal 21 in the disc brake of this type including the inner-and outer pads 8, 9 and the transmitting members 11, 12 is not necessarily required of the piston-retracting function, but only the sealing function is enough for satisfying the raison d'etre of the seal. This non-requirement of the piston-retracting function to the seal 21 is quite significant in the lowering of the manufacturing cost for the cylinder 16, because the machining of the cylinder 16 needs a very high degree precision, if the seal 21 is required of piston-retracting function. That is because an annular recess groove of high precision must be formed in the cylinder for holding the seal 21 which is required to be provided with a predetermined elasticity so as to generate a well adjusted, not too large nor too small, frictional force against the piston 17.

Another embodiment of this invention will be described with reference to FIGS. 7 and 8. Numerals 41, 42 designate flat plate portions of a torque member 43; in openings 44, 44 formed in the flat plate portions 41, 42 on either side of the disc rotor 1 a pair of transmitting members 45, 46 of the same width as that of the openings 44, 44 are mounted. On the transmitting members 45, 46 a gentle slant surface is formed, similar to the previous embodiment, which gradually approaches the disc rotor 1 in the rotational direction, while the car is running forwardly, of the friction surface of the disc rotor 1 formed near the periphery thereof. Inside the transmitting members 45, 46 inner-and outer pads 53, 54 respectively consisting of friction pad 47, 48 and backing plate 51, 52 are disposed such that slant surfaces 55, 56 of the backing plates 51, 52 smoothly contact the above-mentioned slant surfaces of the transmitting members 45, 46, in a complementary manner. The backing plates 51, 52 are made in the width thereof smaller than the transmitting members 45, 46 and are at one end thereof biased to the reverse direction of the rotational direction of the friction surface on the disc rotor 1 with leaf springs 61, 62, which are disposed respectively in a recess 57, 58 formed inside the flat plate portion 41, 42.

In this embodiment the flat plate portions 41, 42 are so constructed as to abut the inner-and outer pads 53, 54 to regulate the movement amount, so there is no need of forming a recess, corresponding to the recess 35 in the previous embodiment, in the transmitting members 45, 46, thus reducing the machining cost.

Still another embodiment is illustrated in FIG. 9 in respect of the inner pad and the transmitting member. In this embodiment a recess 72 is formed in a transmitting member 71, in which a backing plate is fitted. The contacting or transmitting surfaces of the transmitting member 71 and the backing plate 73 are made into slant surfaces 74, 75, which gradually decrease the distance thereto from the friction surface of the disc rotor 1 as it advances radially farther from the axis of the disc rotor 1. In two of the lower corners of a frame portion 76 surrounding the recess 72, where two of the lower corners of the backing plate 73 face the former, there are two pairs of slant surfaces 77, 78 & 81, 82 for abutting respectively to each other. Those slant surfaces increase in slope the farther they advance radially from the axis of the disc rotor 1 on the left or right end thereof. A leaf spring 84 is screwed on in a recess 83 formed in the lower portion of the frame portion 76, each end of the spring is engaged with the outer side of the free end of the frame portion 76 for biasing the backing plate in the direction toward the axis of the disc rotor 1.

Between either side of the backing plate and the frame portion 76 and between the top surface of the backing plate and the frame portion (inner side surface of the recess 72) there is left respectively a predetermined gap or clearance, and the movement of the backing plate 73, corresponding to the amount of the gap, is allowed. An outer pad and a transmitting member holding the former are disposed symmetrically to the inner pad with a similar structure, between the reactionary portion 18 and the disc rotor 1 in an identical manner to that of the previous embodiments.

In such a disc brake including the inner-and outer pads and the transmitting member of this type, a friction pad 85 is, when the braking fluid pressure is applied in the cylinder 16, contacted to the disc rotor 1 to receive therefrom an accompanying rotational force; the backing plate 73 is lifted up along the slant surface 77 of the transmitting member 71. While the backing plate 73 is brought upwards along the slant surface 74 the friction pad 85 is pushed outwards together with the backing plate 73 toward the disc rotor 1 to contact the same. When the fluid pressure is released at this state the backing plate 73 is brought back downwards due to the spring force of the lead spring 84 causing the backing plate to be moved away from the disc rotor 1 leaving a gap or clearance between the two. It enables the elimination of the dragging phenomenon of the disc brake during the non-braking operational time.

What is claimed is:
1. A disc brake comprising:
   a disc rotor having on either side thereof a friction surface;
   a pair of braking pad assemblies respectively consisting of a friction pad disposed face to face with said friction surface and a backing plate secured to the rear side of said friction pad;
   an actuator disposed face to face with said backing plate for urging said braking pad assemblies onto said friction surfaces of said disc rotor by corresponding urging surfaces formed thereon parallel to said friction surfaces;
   a transmitting plate sandwiched at least between one of said braking pad assemblies and said actuator for transmitting the urging force of said actuator to said one of the braking pad assemblies;
   a stationary member supporting said transmitting plate movably in a parallel direction to the axis of said disc rotor;

a slant planar surface formed on said transmitting plate on the side facing said disc rotor, said slant planar surface being so inclined as to gradually decrease the distance from said disc rotor in a direction away from the axis of said disc rotor, and a rear surface of said one of the braking pad assemblies being correspondingly inclined for slidably and closely complementarily contacting said slant planar surface of said transmitting plate to receive urging force of said actuator transmitted by said transmitting plate when the brake is applied;

cam means disposed on said transmitting plate for pushing said one of the braking pad assemblies in a direction away from the axis of said disc rotor, when said one of the braking pad assemblies is laterally moved together with said disc rotor by frictional force produced between the two;

stopper means for limiting the movement amount of said one of the braking pad assemblies in the rotational direction of said disc rotor; and return spring means for restoring said one of the braking pad assemblies to the original position when the brake is released.

2. A disc brake in accordance with claim 1, wherein said return spring means comprises at least one leaf spring secured to said backing plate with a portion thereof contacting said transmitting member.

3. A disc brake in accordance with claim 1, wherein said return spring is a spring disposed between said transmitting member and said backing plate for biasing said backing plate in a direction away from the side surface of said recess, said side surface forming said stopper means.

4. A disc brake as claimed in claim 1, wherein said transmitting plate is provided with a recess formed on the side facing to said disc rotor for accommodating said backing plate in such a manner that a predetermined clearance is left at least between one lateral side surface of said backing plate and a corresponding internal surface of said recess and between an upper surface of said backing plate and a corresponding internal surface of said recess, the bottom surface of said recess being inclined to form said slant planar surface.

5. A disc brake as claimed in claim 4, wherein said stopper means consists of said inner surface of said recess facing said one side surface of said backing plate.

6. A disc brake as claimed in claim 4, wherein said cam means consists of a slant surface so formed in at least one corner portion of said recess on the nearer side to the axis of said disc rotor as to push said backing plate in a direction away from the axis of said disc rotor, when said backing plate is laterally moved with said disc rotor.

* * * * *